(No Model.)

I. BRIGGS.
SAFETY DEVICE FOR DETACHING HORSES FROM VEHICLES IN MOTION.

No. 524,987. Patented Aug. 21, 1894.

Witnesses,
N. C. White
C. S. Craddock

Inventor,
Isaac Briggs
per N. W. Stearns,
Atty.

UNITED STATES PATENT OFFICE.

ISAAC BRIGGS, OF MIDDLEBOROUGH, MASSACHUSETTS.

SAFETY DEVICE FOR DETACHING HORSES FROM VEHICLES IN MOTION.

SPECIFICATION forming part of Letters Patent No. 524,987, dated August 21, 1894.

Application filed May 5, 1894. Serial No. 510,220. (No model.)

*To all whom it may concern:*

Be it known that I, ISAAC BRIGGS, of Middleborough, Plymouth county, Massachusetts, have invented a Safety Device for Liberating Horses from Vehicles in Motion, of which the following is a full, clear, and exact description, reference being had to the accompanying drawings, making part of this specification, in which—

Figure 1:
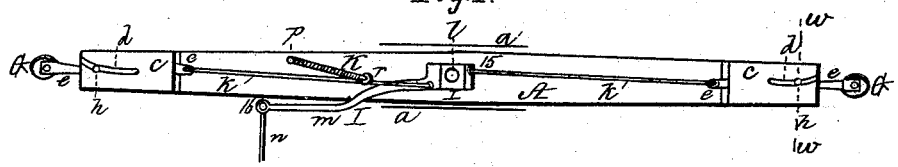
Figure 2:
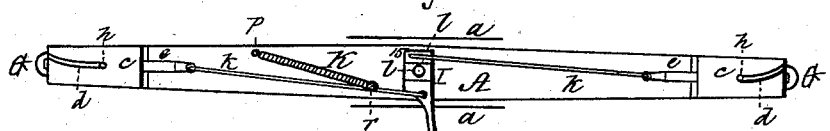
Figure 3:
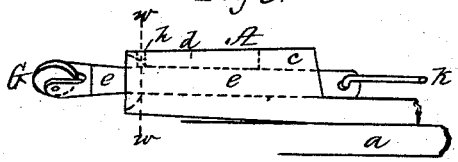
Figure 4:
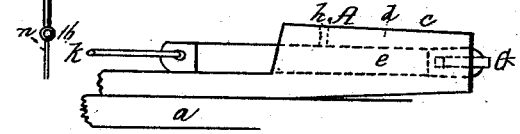
Figure 5:
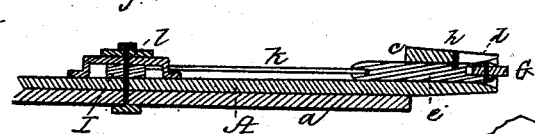
Figure 6:
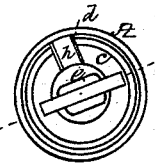
Figure 7:
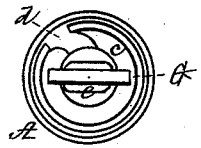
Figures 9, 10:
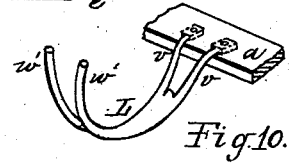
Figure 8:
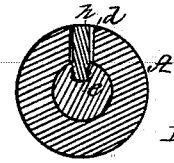
Figure 11:
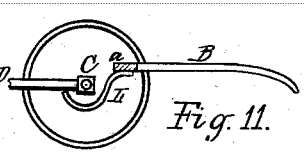
Figures 12, 14:
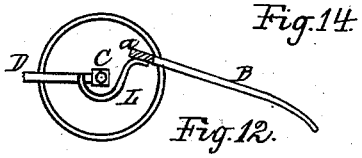
Figure 13:
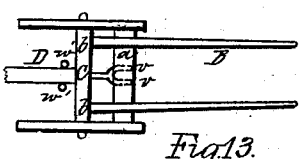

Figures 1 and 2 are plans of the under side of a whiffletree inverted, with my trace irons—their operating lever and interposed connections applied thereto in their trace holding and releasing positions; Figs. 3 and 4 side elevations of the extremities of the whiffletree, and their trace irons in both positions; Fig. 5 a vertical section of one half of the whiffletree; Figs. 6 and 7 end elevations showing the two positions of the trace irons; Fig. 8 a cross section on line $ww$ of Fig. 1 enlarged. Fig. 9 represents my improved holdback iron; Fig. 10 my combined shaft supporter and axle lock; Figs. 11, 12, and 13 the application of the same showing its positions when the shafts are up and down; Fig. 14 a modification of a detail to be referred to.

My present invention relates to that class of devices designed to liberate horses when desired from vehicles while in motion, for instance in the event of the driver wishing to prevent the animal from running away, or in case of his sickness or accident to himself or carriage and to avoid collision or driving over dangerous places;—and this invention consists in a pair of trace irons of peculiar construction capable of being simultaneously drawn inward and rotated by the driver into a position which insures the prompt disengagement of the traces therefrom.

This invention also consists in an arresting device or stop for preventing the dropping of the forward ends of the shafts to the ground at the time of the liberation of the horse, said stop also performing the function of securely holding the forward axle from turning on its pivotal bolt around in a horizontal plane, whereby the change in the direction of the wheels is prevented, and the liability of the carriage being upset thereby is avoided.

In the said drawings A represents the whiffle-tree secured to the ordinary cross bar $a$ which connects the shafts B a short distance in advance of their rear ends $b\ b$ which are made fast to the forward axle C.

D is the "reach" connecting the rear and forward axles (Figs. 12 and 13). At each of its outer ends the under side of the whiffletree is provided with a metal (preferably malleable iron) socket $c$ through the shell or wall of which is formed a cam shaped slot $d$ and within each socket is located a short cylindrical rod $e$ having a pin $h$ projecting therefrom into the cam shaped slot.

The outer end of each rod $e$ is bifurcated for the reception of a strong disk or wheel G which is pivoted and free to revolve therein, these cylindrical rods serving as trace irons and the wheels G as projections over which the rear slotted ends of the traces (not shown) are caught; the angle of inclination of the circular plane of each wheel in its normal position being down and rearward see Fig. 6 which insures the reliable attachment of the trace thereto when the horse is harnessed within the shafts.

By operating the following described connections both trace irons $e\ e$ are drawn into their sockets and simultaneously partially rotated, each wheel being thereby brought into a horizontal position see Fig. 7 which admits of the ready disengagement of its trace therefrom, the said trace being carried inward against the end of the whiffletree by the receding iron moving in its socket and being pressed and crowded outwardly over and away from the wheel while in its horizontal position.

To the inner end of each trace iron is secured one end of a strong wire or rod $k$, the other end of which is fastened to one of the thick ends of a lever I, through which passes the bolt $l$ by which the whiffletree is pivoted to the cross bar $a$,—i.e. the inner end of one rod $k$ is secured to the outer end 15 of the lever I on one side of its axis or fulcrum $l$, and the inner end of the other rod $k$ is secured to the other side of said lever at a point equidistant (as the other rod) from the axis or fulcrum.

The lever I terminates at its other end in an arm $m$ having an eye 16 with which is connected a wire $n$ leading to some suitable place accessible to the driver in the vehicle, for instance to a point inside or in front of the dasher or through the floor. This lever in its normal position is held close to the side of the whiffletree see Fig. 1, by a strong spiral spring K, one end of which is secured to a screw or pin $p$ projecting down from the under side of the whiffletree and a loop $r$ formed in the contiguous wire K secures the other end of said spring, and the withdrawal and rotation of the trace irons $e\,e$ and their wheels G G by the movement of the lever arm $m$ into the position seen in Fig. 2 is effected against the resistance of said spring K, which, on the release of the operating arm returns it into the position seen in Fig. 1.

On each shaft is located a hold back iron, $s$, the front portion of which may be made yielding see Fig. 9 by a curved strip of spring metal $t$ secured at 17 to the horizontal rigid portion 18 and having its free end depressed or bent down by the forward pull on the hold back strap when the horse advances after the traces are detached—said yielding hold back iron facilitating the clearance of the said straps. To prevent the forward ends of the shafts from dropping upon the ground after the horse is liberated, and also to prevent the swinging of the forward axle around on its bolt and consequently the change in the direction of its wheels which would be liable to overturn the vehicle, I employ a device L of the following construction: It consists of a bent arm having a pair of bifurcations or forks at each end—the forks $'v\,v$ at the forward end being flattened and bolted to the under side of the cross bar $a$ while the forks $w'\,w'$ at its rear are free and passing under the axle (without contact therewith) project up on each side of the reach D near its junction with the axle C and abut against the sides of the reach and securely grasp it Fig. 12 so that the shafts are supported and their forward ends prevented from dropping on the ground when the horse has been liberated from the vehicle while in motion. In this position the device serves also to prevent the turning (in a horizontal plane) of the forward axle around on its pivotal bolt and thus prevents the change in the direction of the wheels which would be liable to overturn the vehicle before it ceased moving after the horse was liberated, Figs. 12—13.

When the shafts are up and supported by the harness of the horse, the plane of the cross bar is nearly horizontal, in which position the rear of the arm is deflected so as to withdraw its forks $w'\,w'$ from contact with the reach, thus permitting of the required turning of the axle and its wheels to conform to any direction in which the horse is guided, see Fig. 11, this device forming a combined shaft supporter and axle lock.

In Fig. 14 is represented the end of a trace iron with a circular projection integral therewith, but I prefer a wheel G for when the traces are pressed outwardly against them they are free to revolve, which revolution assists in disconnecting and releasing the trace irons, which result is instantly and reliably accomplished when the driver operates the detaching lever.

I claim—

1. A pair of trace irons $e\,e$ each having at the end a projection wider than the body of said iron, and a guide pin $h$ projecting from its side, a whiffle tree A having sockets $c\,c$ each provided with a recess having its outer end wider than said projection of the trace iron, and a cam shaped slot $d$ in its side, in combination with a releasing lever I pivoted to the whiffle tree, connecting rods $k\,k$ and a spring K having one end secured to one of said connecting rods substantially as described.

2. A combined shaft-supporting and axle-locking device L, secured at its forward end preferably to the cross bar $a$ and engaging with the reach D for preventing the dropping of the shafts upon the ground and also for preventing the forward axle C from turning around its bolt, and its wheels from changing their direction, substantially as set forth.

Witness my hand this 24th day of April, 1894.

ISAAC BRIGGS.

In presence of—
ALONZO F. RYDER,
AMASA R. GLIDDEN.